US008065086B2

(12) United States Patent
Yu et al.

(10) Patent No.: US 8,065,086 B2
(45) Date of Patent: Nov. 22, 2011

(54) METHOD FOR ESTIMATING MISSING WELL LOG DATA

(75) Inventors: Yingwei Yu, Katy, TX (US); Douglas J. Seyler, Richmond, TX (US); Michael D. McCormack, Sequim, WA (US)

(73) Assignee: IHS Inc., Englewood, CO (US)

( * ) Notice: Subject to any disclaimer, the term of this patent is extended or adjusted under 35 U.S.C. 154(b) by 482 days.

(21) Appl. No.: 12/250,983

(22) Filed: Oct. 14, 2008

(65) Prior Publication Data

US 2010/0094557 A1    Apr. 15, 2010

(51) Int. Cl.
  G01V 1/40 (2006.01)
(52) U.S. Cl. ............................................. 702/6; 702/85
(58) Field of Classification Search .................. 702/6, 7, 702/9, 11, 36, 166, 85
  See application file for complete search history.

(56) References Cited

U.S. PATENT DOCUMENTS 7,280,932 B2 * 10/2007 Zoraster et al. ................. 702/85

OTHER PUBLICATIONS

Specht, D. F., A General Regression Neural Network, IEEE Transactions on Neural Networks, Nov. 1991, 568-576, vol. 2:6.
Hinneburg, A., and Keim, D. A., Optimal Grid-Clustering: Towards Breaking the Curse of Dimensionality in High-Dimensional Clustering, Proceedings of the 25th VLDE Conference, Edinburgh, Scotland, 1999, 12 pages.
Parzen E., On estimation of a probability density function and mode, Ann. Math. Stat. 33, pp. 1065-1076, Aug. 29, 1961.
Jolliffe, I. T., Principle Component Analysis, 2002, 3 pages, 2nd Edition, Springer, NY.
Herrera V. M., Russell, B. H., and Flores, A., Neural Networks in Reservoir Characterization, The Leading Edge, Apr. 2006, pp. 402-411, vol. 25:4.
Russell, B. H., Lines L. R., and Hampson, D. P., Application of the Radial Basis Function Neural Network to the Prediction of Log Properties from Seismic Attributes, CREWES Research Report, 2002, pp. 1-21, vol. 14.
Frayssinet D., Thiria S., Badran F., and Briqueu L., Use of Neural Networks in Log's Data Processing: Prediction and Rebuilding of Lithologic Facies, Petrophysics Meets Geophysics—Paris, France, Conference Proceedings: European Association of Geoscientist and Engineers, The Netherlands, paper A-11, Nov. 2000, pp. 1-8.
Bhatt, A. and Helle, H. B., Committee Neural Networks for Porosity and Permeability Prediction from Well Logs, Geophysical Prospecting, 2002, 2 pages, vol. 50:6.
Holmes M., Holmes D., and Holmes A., Generating Missing Logs B Techniques and Pitfalls (Extended Abstract), AAPG Annual Meeting, Salt Lake City, Utah., May 2003, 5 pages.
Robertson, A., The Sampling Variance of the Genetic Con-elation Coefficient, Biometrics, Sep. 1959, pp. 469-485, vol. 15:3.
Hampson, D. P., Schuelke, J. S., and Quirein J. A., Use of Multi attribute Transforms to Predict Log Properties from Seismic Data, Geophysics, Jan.-Feb. 2001, pp. 220-236, vol. 66(1). Digital Formation online documentation, LESA Esteem, Digital Formation, Inc., http://digitalformation.com/documentation.htm, 3 pages.
Hampson-Russell online documentation, Emerge, http://www.veritasdgc.com, Inc., 4 pages, Feb. 21, 2007.

* cited by examiner

*Primary Examiner* — John H Le
(74) *Attorney, Agent, or Firm* — Blakely Sokoloff Taylor & Zafman LLP

(57) ABSTRACT

The invention relates generally to the field of oil and gas exploration and specifically to the use of well logs for exploration. This invention is directed to a method for estimating data that would have been collected in a region of a well log where there is a gap. This method uses identified elements in one data set to identify elements in another data set with data values indicative of the same geological characteristic as those in the first data set.

19 Claims, 9 Drawing Sheets

METHOD FOR ESTIMATING MISSING WELL LOG DATA

FIELD OF INVENTION

The invention relates generally to the field of oil and gas exploration and specifically to the use of well logs for exploration. This invention is directed to a method for estimating data that would have been collected in a region of a well log where there is a gap. This method uses identified elements in one data set to identify elements in another data set with data values indicative of the same geological characteristic as those in the first data set.

BACKGROUND OF THE INVENTION

A "well log" comprises data collected along the path of a hole in the ground. Such holes are referred to as "wells" in the art of oil and gas exploration. A well log "curve" is a sequential collection of one category of data, such as resistivity or gamma ray activity. A well may have several logs, and a log may have several curves.

A primary task in the search for oil and gas is to gain an understanding of the distribution and nature of rocks and fluids in the subsurface. This understanding is important for the success and the efficiency of the search. Well logs provide direct information about what is in the subsurface. Data collected by logging wells can have significant economic consequences because wells may cost millions of dollars and oil deposits can be worth billions of dollars.

Several logs are commonly acquired from each well. Data are usually acquired by lowering sensing tools into the hole by cable. The cable holds the tools and maintains electrical connection with recording equipment at the surface. Data are acquired by the sensors and "logged" (recorded) at the surface as the tool is pulled up the hole. Data may also be acquired by instrumentation at the bottom of the hole while drilling is in progress. Data collected in or descriptive of the rock and fluid surrounding the hole fall into the category of "well log data".

Well logs provide detailed and direct measurements of rock and fluid properties in the subsurface. Examples of such measurements are (a) gamma ray intensity, which relates to the types of minerals present; (b) electrical resistance, which relates to the quantity and types of fluids; and (c) sonic velocity (the time required for sound to travel from sender to receiver), which relates to both rock and fluid properties. These three examples are illustrative of the hundreds of well logs that may be collected.

Unfortunately, gaps are sometimes present in well logs. Well log gaps result in less information on which to base a model and more uncertainty regarding what will be encountered when the next well is drilled. Gaps are present for a variety of reasons. Tools may fail or malfunction, or operators may turn off recording equipment at the wrong time. It may be discovered after the fact that the wrong interval was logged.

SUMMARY OF THE INVENTION

One embodiment of the invention disclosed herein is directed to a method for estimating the data that would have been collected in the region of a gap in a well log. Another embodiment of the invention disclosed herein is directed to a method for estimating the accuracy and reliability of the rock properties in the gap.

DESCRIPTION OF THE PREFERRED EMBODIMENTS

Figure 2:
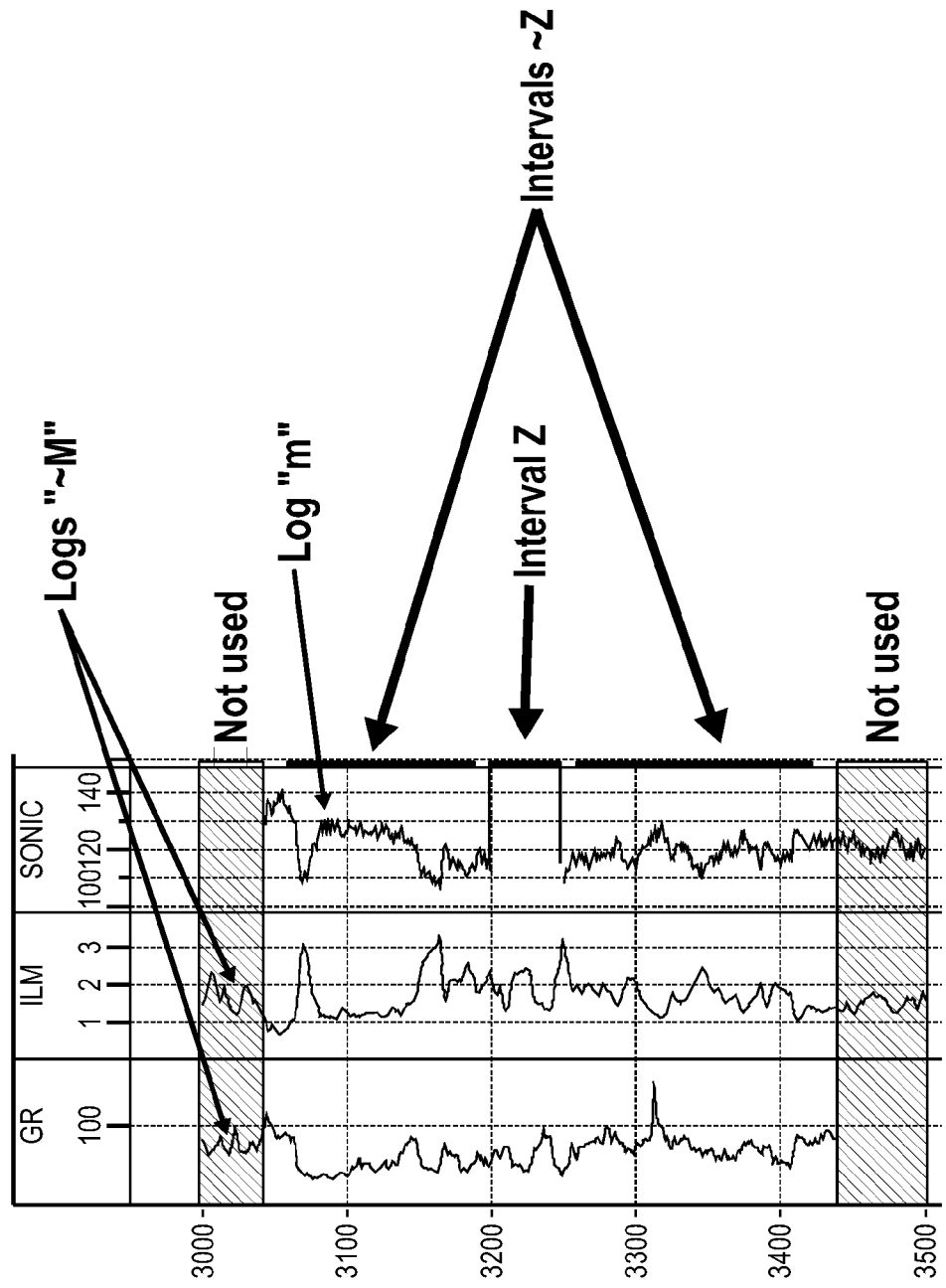
FIG. 2 is a graphical representation of recorded well log data suitable for use with preferred embodiments of the invention disclosed herein.

Consider the case of a well that has N logs with one log, designated "m", which has a gap in interval Z, as shown in FIG. 2. Let ~M refer to logs other than m and let ~Z refer to the intervals above and below Z over which all logs have values, as shown in FIG. 2. Depths where logs are absent are not used by a preferred method of the invention described herein. A preferred embodiment of the invention disclosed herein derives a prediction algorithm that uses a plurality of logs ~M to predict m in the intervals ~Z, and then uses this algorithm to predict values of m in the interval Z, thus filling the gap.

For notation purposes, the interval Z contains sample locations i, where values $v_i$ are to be predicted. Values in other logs, logs in the set ~M, at the same depth as location i collectively constitute the element $p_i$ in the set P. The interval ~Z contains samples at locations j, where values $v_j$ are known. Other data at locations j in the interval ~Z are combined with $v_j$ to form the element $q_j$. All such elements in ~Z are collectively called the set Q.

In a preferred embodiment, the invention disclosed herein is directed to a method for selecting samples of geological data. In a preferred embodiment, the first step of this method is acquiring a data set comprising multiple data values indicative of at least one geological characteristic at locations in a subsurface interval of rock, as shown in Block 10 of FIG. 1.

Figure 1:
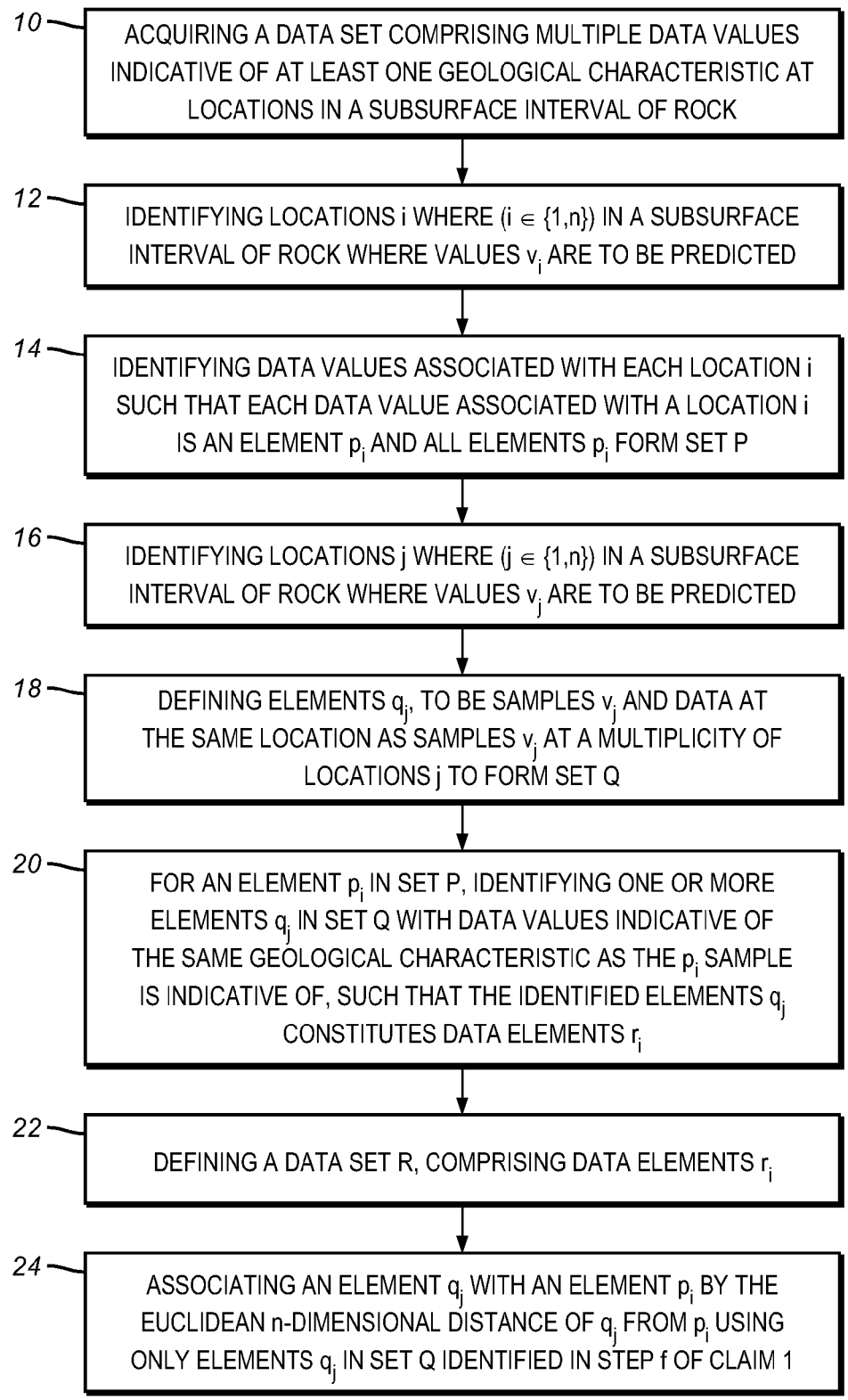
FIG. 1 is a block diagram of a preferred method of the invention disclosed herein.

In a preferred embodiment, the second step of this method is identifying locations i where (i ∈ {1,n}) in a subsurface interval of rock where values $v_i$ are to be predicted, as shown in Block 12 of FIG. 1.

In a preferred embodiment, the third step of this method is identifying data values associated with each location i such that each data value associated with a location i is an element $p_i$ and all elements $p_i$ form set P, as shown in Block 14 of FIG. 1.

In a preferred embodiment, the fourth step of this method is identifying locations j where (j ∈ {1,m}) in a subsurface interval of rock where data values $v_j$ from the data set are known, as shown in Block 16 of FIG. 1.

In another preferred embodiment, locations i and j are depth locations. In another preferred embodiment, i comprises locations in a first well log curve from a first well which is missing sample values. In another preferred embodiment, $p_i$ comprises sample values from a second well log curve in the first well and at the same depths i. In another preferred embodiment, j are locations in a first well log curve from a first well which is missing sample values comprising data in wells other than the first well at depths where value $v_j$ is known.

In a preferred embodiment, the fifth step of this method is defining elements $q_j$ to be samples $v_j$ and data at the same location as samples $v_j$ at a multiplicity of locations j to form set Q, as shown in Block 18 of FIG. 1.

In another preferred embodiment, values $v_j$ are known well log values. In another preferred embodiment, the data at the same location as samples $v_j$ at a multiplicity of locations j are log values at the same depth as $v_j$.

In a preferred embodiment, the sixth step of this method is for an element $p_i$ in set P, identifying one or more elements $q_j$ in set Q with data values indicative of the same geological characteristic as the $p_i$ sample is indicative of, such that the identified elements $q_j$ constitutes data elements $r_i$, as shown in Block 20 of FIG. 1.

In a preferred embodiment, the seventh step of this method is defining a data set R, comprising data elements $r_i$, as shown in Block 22 of FIG. 1.

Another preferred embodiment of the invention comprises the first through seventh steps described above plus the eighth step of associating an element $q_j$ with an element $p_i$ by the Euclidean n-dimensional distance of $q_j$ from $p_i$ using only elements $q_j$ in set Q identified in step f of claim 1, as shown in Block 24 of FIG. 1.

In a preferred embodiment, the content of elements $q_j$ are compared with the contents of a given element $p_i$. Those elements $q_j$ which are designated "similar" to $p_i$ are designated $r_i$. The elements $r_i$ are collectively referred to as the set R. For each element $p_i$, then, there is a set R which contains elements of similar content. R is the basis of predicting the value $v_i$. If the data are such that R is empty, then $v_i$ cannot be predicted.

FIG. 2 displays data from gamma ray, electrical, and sonic logs. These three logs extend from a depth of 3000 meters to 3500 meters. The sonic log shown in FIG. 2 has a gap between 3200 meters and 3250 meters. In a preferred embodiment, sample values $v_i$ are to be predicted at locations i in this depth range. In the ranges of 3043 meters to 3200 meters and 3250 meters to 3439 meters, all logs shown in FIG. 2 have values. Samples in these depth ranges comprise the elements $q_j$ at each location j. One or more embodiments of the invention disclosed herein can predict the sonic log in the ranges 3043-3200 and 3250-3439 and then apply that prediction to predict the values in the range 3201-3249.

In a preferred embodiment, three pre-processing steps are used. These three steps are (1) log values are normalized to the range [−1, +1]; (2) logs that best predict the target log are selected; and (3) samples are chosen from these logs to predict the missing data.

Normalization compensates for the different units of log values. A gamma ray log has values on the order of 100, while a resistivity log has values on the order of 1. In the absence of normalization, traditional numerical analysis would give greater weight to the gamma ray log.

In a preferred embodiment, normalization is a procedure wherein values are offset and scaled so that the original range matches the given normalization range. If the minimum value in a given log were zero and the maximum 150, normalization would be accomplished by subtracting 75 (the mid-point between zero and 150) and then dividing the result by 75 (half the range). If the minimum were −40 instead of zero, then subtracting 55 and dividing by 95 would normalize the log. The smallest value would be −1 and the largest would be +1.

Let $L_0$ designate the original set of logs excluding log m. In a preferred embodiment, we first omit logs with too many null values. In another preferred embodiment, we eliminate logs with more than 50 percent null values. In other embodiments, a different null value cutoff might be used. The set of logs $L_1$ represents those remaining from $L_0$ after the elimination of logs with too many null values.

In a preferred embodiment, the next step is to cross correlate the logs in $L_1$. Logs in this set may be grouped according to similarity. In a preferred embodiment, only one log from each group is kept. This set of logs, one from each group, is designated $L_2$.

In a preferred embodiment, the standard statistical correlation coefficient is used for cross correlation. If the value of sample j in log S is represented by $S_j$, then the standard deviation is computed by $$\sigma_S = \sqrt{\{[n\sum Sj^2 - (\sum Sj)^2]/n^2\}},$$

where n is the number of samples. The same formula is used to calculate $\sigma_T$ for log T. Then the average cross product is computed as $$C = \sum_{j=1,n} [Sj * Tj/n - S_{avg} * T_{avg}],$$

where $S_{avg}$ and $T_{avg}$ are average values for the logs. The correlation, r, is $r = C/(\sigma_S * \sigma_T)$.

If the curves are identical, the value of r will be +1. If one is the mirror image of the other, r will be −1. Logs with correlations near either −1 or +1 are redundant and therefore too similar for both to be kept.

To decide which logs to keep, we group the logs by similarity and choose one log from each group. Each log in a group is correlated with log m in the zone ~Z. The log with the highest correlation, r, is selected to represent the group. Correlation is a measure of linear prediction, so we are selecting logs that best predict the target log in the intervals ~Z using a linear equation. If there are n groups of logs, then the set $L_2$ will contain n logs.

We next find the subset of $L_2$ that best predicts m in the interval ~Z using the General Regression Neural Network ("GRNN") algorithm. This is a test of non-linear correlation. These logs will be the set $L_3$. One suitable GRNN for use in predicting m in the interval ~Z is described in Specht, D. F. 1991, "A general regression neural network IEEE Transaction on Neural Networks" at pages 568-576.

If there are n logs in $L_2$, n tests will be conducted. Logs are ordered by the linear correlation coefficient, and for each test the log with the smallest correlation is dropped.

For each test, a portion of the samples are selected. Samples are selected by randomly choosing a portion of the ~Z sampling depths common to all logs. For example, if the common interval contains 120 samples, less than 120 will be selected. If a sample is null in any of the logs at the given depth, another depth is chosen, and the process is repeated until a desired number have been selected.

A first portion of these samples are designated, randomly, for training the GRNN algorithm, and a second portion are designated for testing. The GRNN algorithm uses each of the n sets of logs to predict values in log m, and each calculation produces a measure of how good the prediction is. The equation for scoring each set of logs is $$S = w_1 \alpha + w_2 \kappa$$

where $w_1$ and $w_2$ are the scoring weights (we use $w_1=1$ and $w_2=1$).

$\alpha$ and $\kappa$ measure accuracy and error. $\alpha$ is the average difference between the predicted values and the actual values, divided by the maximum difference—and subtracted from 1. In equation form:

$$\alpha = 1 - \text{Average}|\text{predicted}-\text{actual}|/(\text{maximum actual} - \text{minimum actual})$$

$$\kappa = \text{correlation determined by the GRNN algorithm}$$

If predictions are good, $\alpha$ and $\kappa$ will be near 1, and S will be 2. If predictions are poor, S will be nearer 0.

The set of logs with the largest score will be the set $L_3$.

Figure 3:
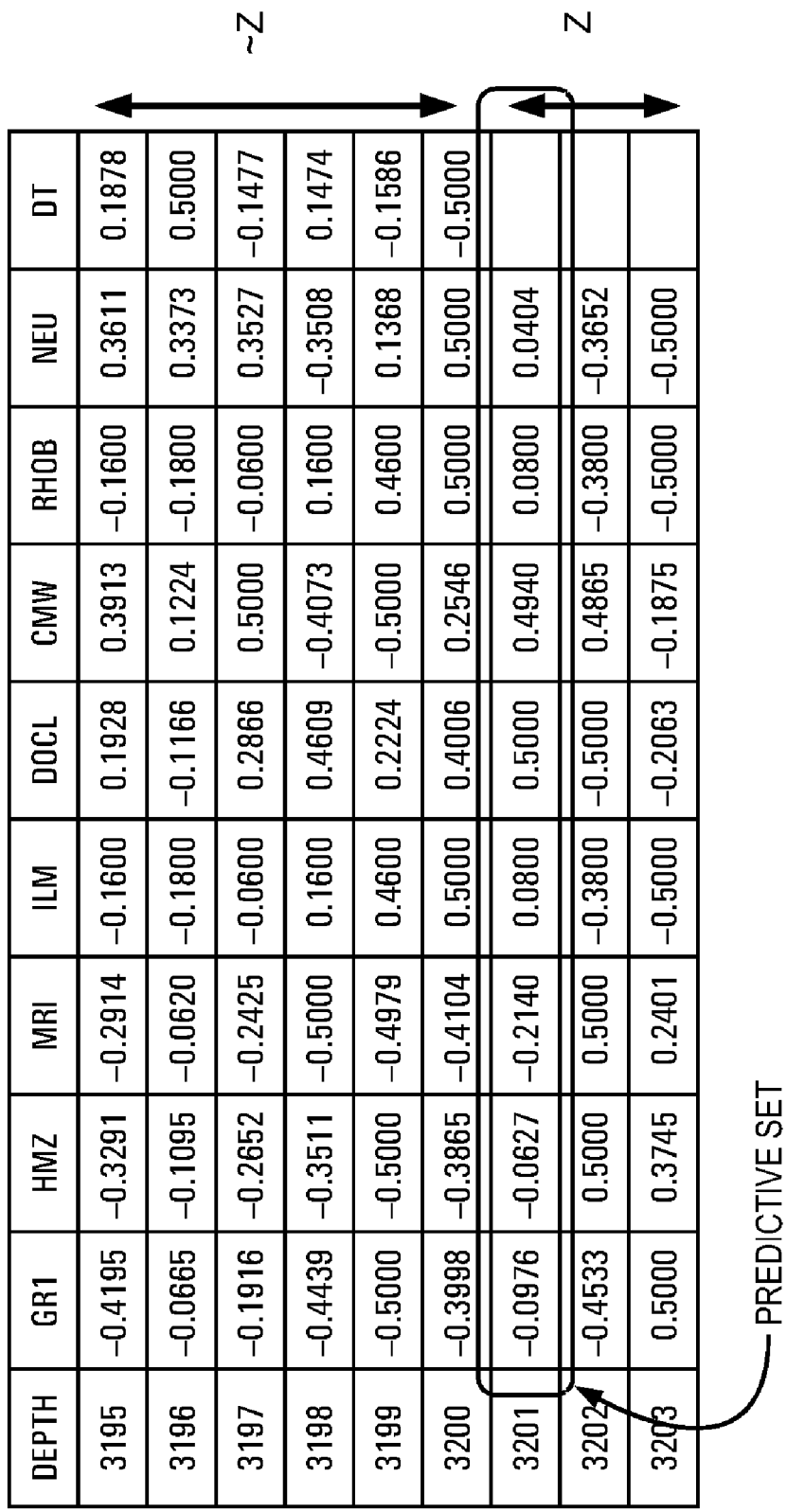
FIG. 3 displays well log values at corresponding depths in numerical format.

We now predict values in the gap. Samples are selected that are similar to the samples at the given depth at which the log value is to be predicted. FIG. 3 shows part of a table of numbers that could be used for this purpose. Values in the DT column are missing, with one row of numbers designated "Predictive set" and at depth of 3201. The objective is to use the eight numbers to the left to predict the missing value.

This is done by comparing this row of eight numbers, in interval Z, with all other rows in interval ~Z. Similar rows have values in the DT column and so form a basis for predicting the value at depth 3201. Excluding column DT, we call the numbers in the interval Z set z and those in the interval ~Z, set ~z.

Similar rows are found by using each number as a coordinate in an n-dimensional space. Points close together in this space are similar. The method is illustrated in FIGS. 4, 5, and 6.

Figure 4:
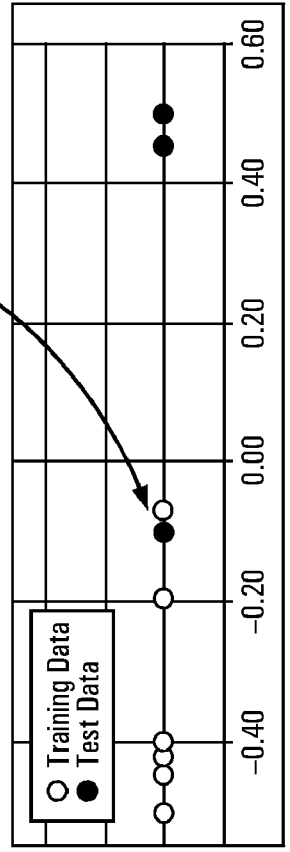
FIG. 4 illustrates how similar log values may be identified when only one log curve is available.

FIG. 4 assumes there are only two columns of data, GR1 and DT. Rows in the table at the right of FIG. 4 have been sorted by GR1. This is the order in which they would appear if plotted on a line, as illustrated below the table. Blue points represent rows that have DT data, and red points represent rows that do not have DT data. Rows with numbers near −0.0976 would be chosen to make the estimate for depth 3201. The nearer the values of GR1 were to −0.0976, the more weight would be given their predictions. When more than one column is used as a predictor, the rows cannot be posted as points on a line but must be posted in a higher dimensional surface.

Figure 5:
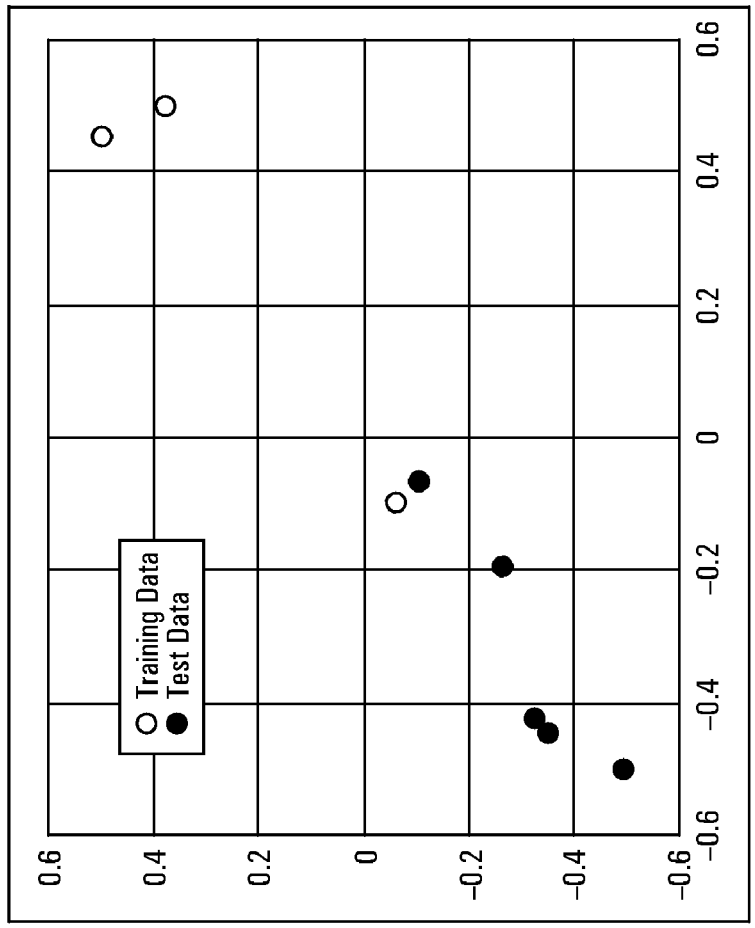
FIG. 5 illustrates how similar log values may be identified when two log curves are available.

FIG. 5 illustrates the analysis with three columns of data. A simple sort would not be effective, but a cross plot makes it clear which training rows are "near" the target rows. We use the Pythagorean Theorem to calculate distance, but non-Euclidean measures might also be used.

Figure 6:
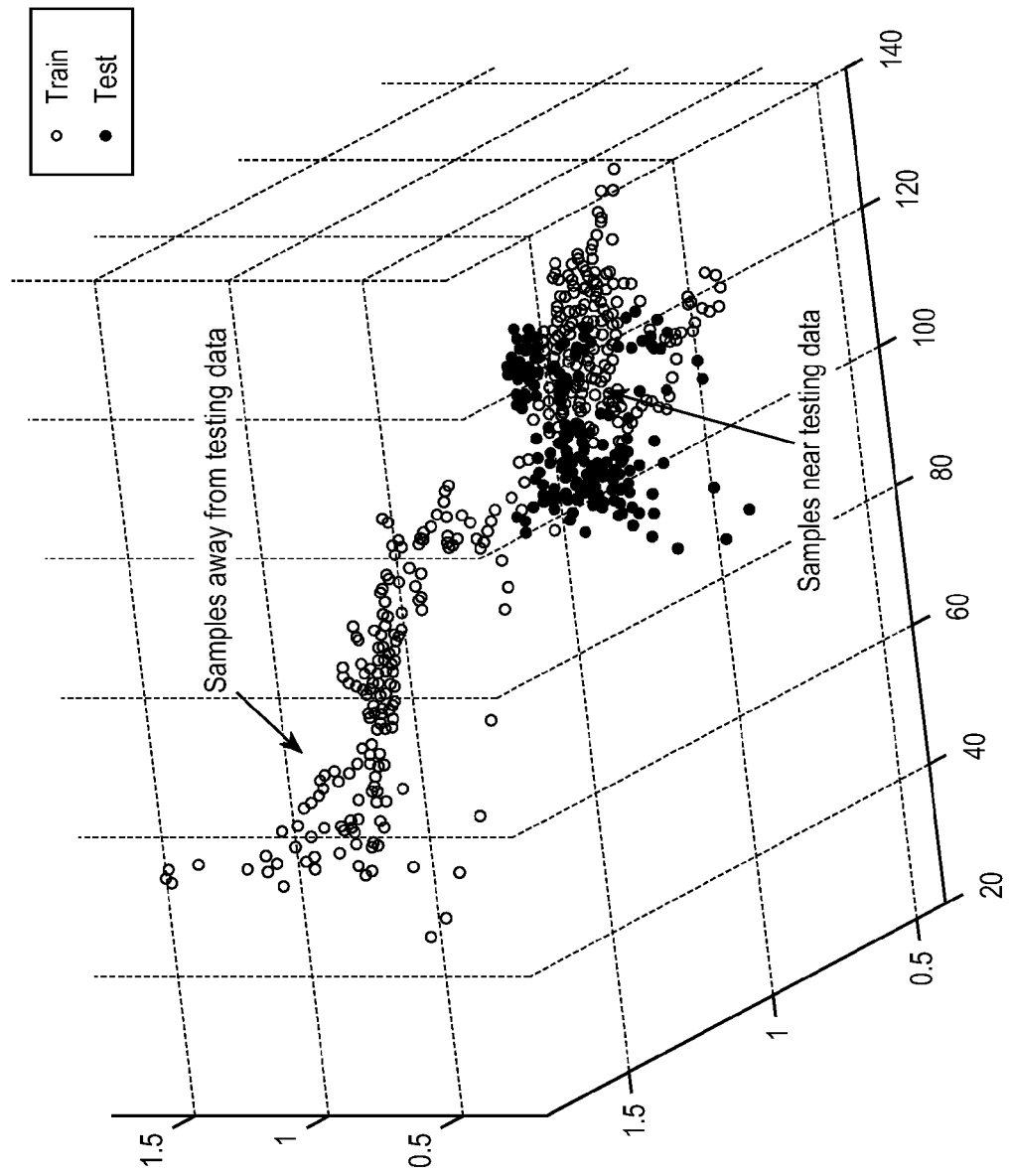
FIG. 6 illustrates how similar log values may be identified when three log curves are available.

FIG. 6 illustrates the plot when four columns are present. Points are displayed as if they were floating in space. The Pythagorean Theorem still serves to compute the distance between points, and it can be applied to as many dimensions as needed.

Figure 7:
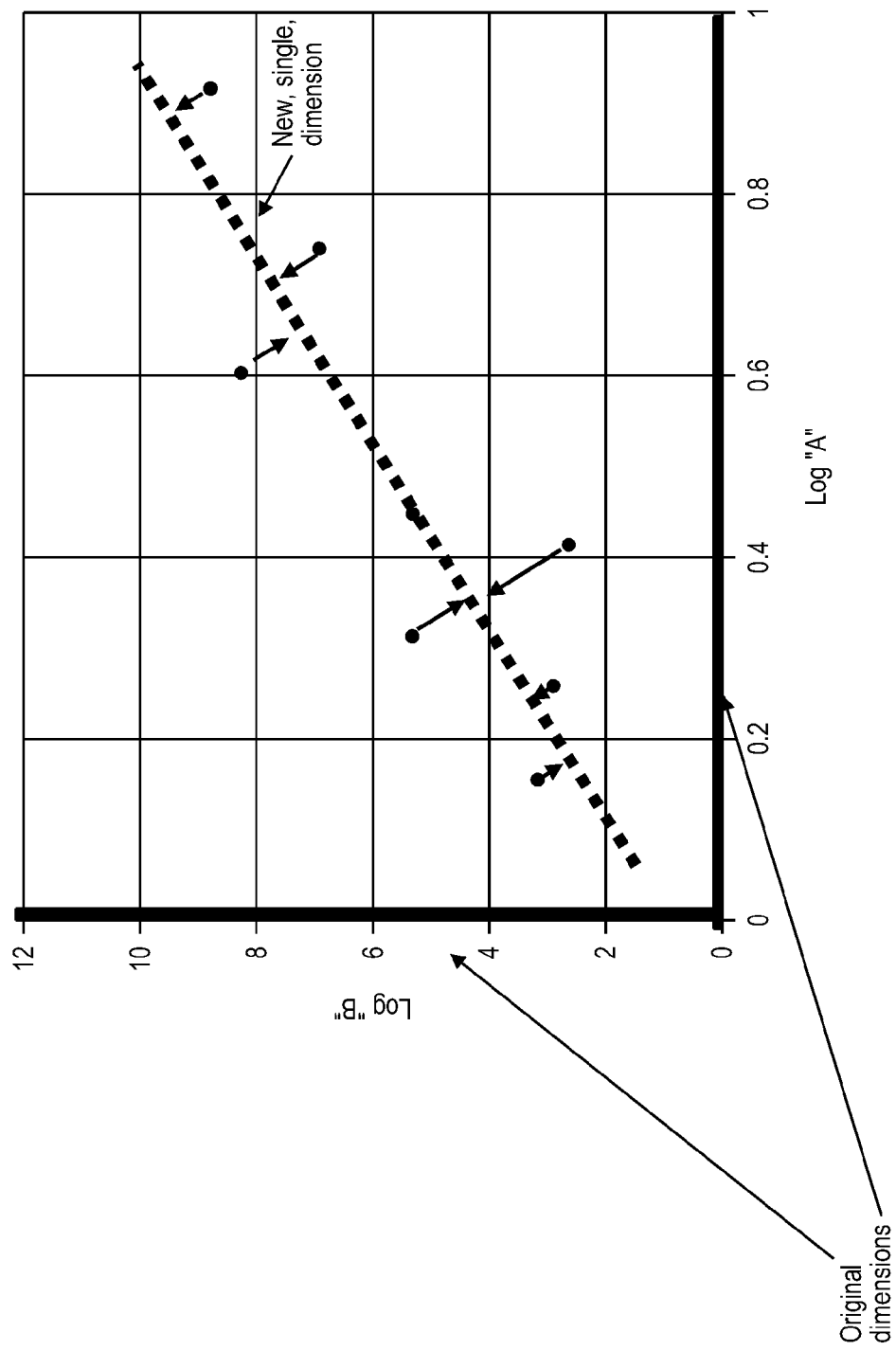
FIG. 7 illustrates how the principle components method can reduce the number of variables.

At this stage, Principle Components Analysis ("PCA") may be applied to reduce the number of dimensions. This is particularly useful if there are many logs. PCA makes use of correlations between measurements. One suitable method of PCA for use in reducing the number of dimensions is described in Jolliffe, I. T., 2002, *Principal Component Analysis, Series: Springer Series in Statistics,* 2nd ed., Springer, N.Y.). FIG. 7 illustrates the PCA method in two dimensions.

The trend of points allows us to replace the two original dimensions with one dimension. For each sample, only the distance along the line (indicated by the arrows pointing from points toward the line) is used. Rather than using two log measurements only one measurement, along the principle axis, is required. PCA usually reduces the number of independent measures to two or three.

The trend, or correlation, shows that information about log A allows one to predict log B. The line drawn through the points, the line along which measurements are made, eliminates the redundancy in the information.

FIG. 6 could also illustrate the analysis after PCA has been applied. In this case, measurements are along the principle axes rather than direct log measurements. For each sample in z (each red point), we compute its distance to each point in ~z. For the sample $z_d$ at depth d, the distance to sample $\sim z_D$ at depth D is $$D_{dD} = \sqrt{\text{Sum of}\left(\begin{array}{c}\text{log values at} \sim z_D - \\ \text{corresponding log values at } z_d\end{array}\right)^2}$$

If $D_{dD}$ is too large (we use a distance of D=0.5; other distances may be used), the point in $\sim z_D$ (a blue point) is dropped.

The GRNN algorithm is applied to the points within the required distance to develop a predictor for the missing log. The predictor is then applied for each blue point and the predictions are averaged and the average is the value predicted for the red point.

We now compute the confidence, $C_d$, in our prediction at depth d in set z. The total distance from $z_d$ to all samples is $$D_d = \sqrt{\Sigma_D (D_{dD})^2}$$

Our confidence in the prediction at this well is expressed by summing the distances for all samples in z and applying a sigmoid function:

$$C_d = \text{Sigmoid}(\Sigma_z(1-D_d))$$

The sigmoid we use is a two-parameter logistics function:

$$\text{Sigmoid}(t) = 1/(1+e^{-k(t+t0)})$$

Figure 8:
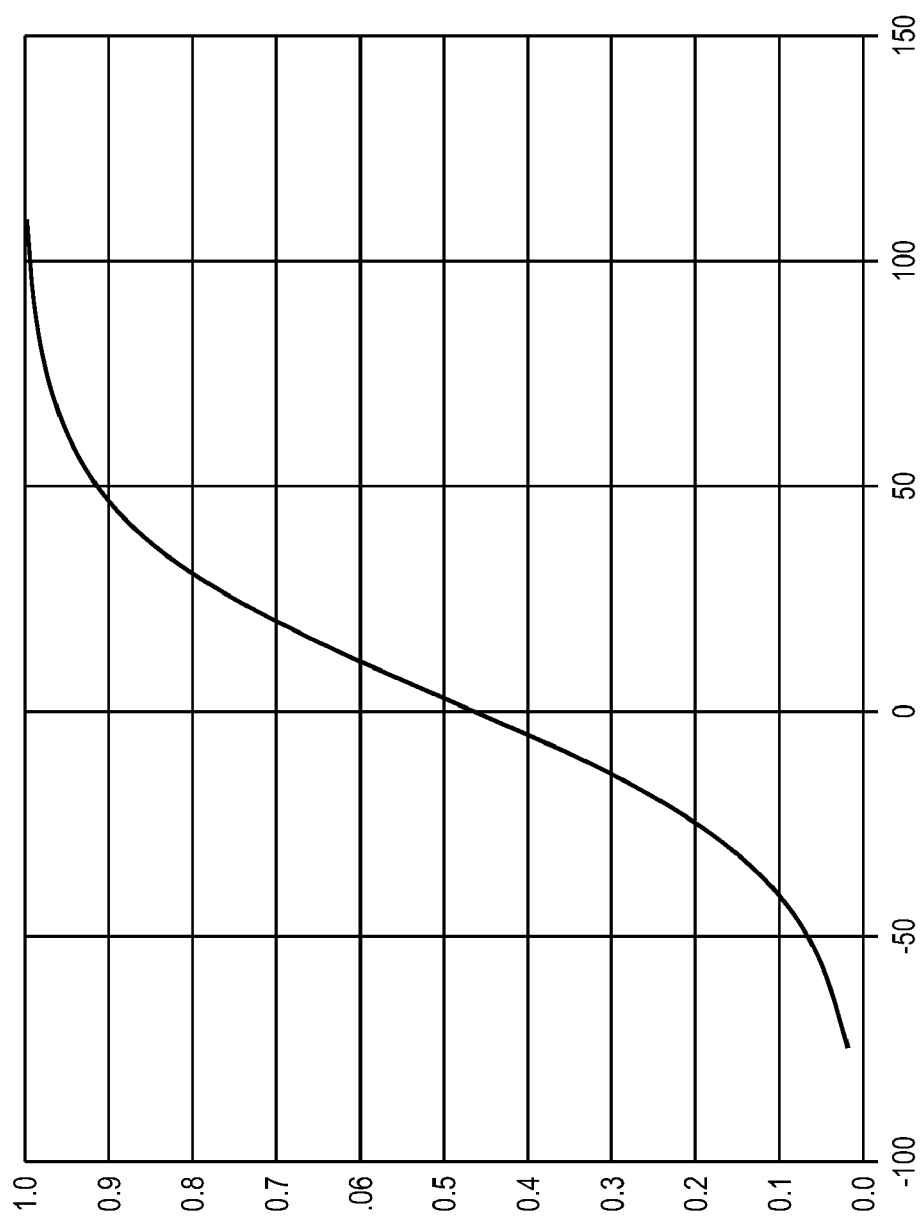
FIG. 8 illustrates a typical sigmoid function.

The parameter k gives the slope of the sigmoid, and t0 is the offset. We typically use k=2 to 6 and t0=−2 to −6. FIG. 8 shows a typical sigmoid.

For each value in z we now have a predicted value and a measure of confidence in the prediction. The method for prediction within a single well is complete.

The analysis can be extended to several wells. Wells are analyzed one by one, and each well is treated in the same way as outlined here except that 1) the randomly chosen test samples are always in the target well while the randomly chosen training samples are in the other well and 2) there is no interval in the other well that corresponds to Z. In addition, if the score for the final set of logs, $L_3$ ($S=w_1\alpha+w_2\kappa$) is too small, the well is not included in the analysis.

After the analysis has been performed on W wells with w wells rejected, we have N=W−w predictions and N confidence measures over the interval z in well log m. These can be thought of as N prediction curves and N confidence curves. The prediction curves are averaged to produce the final prediction, with the confidence of each value used as a weight in the averaging.

Let $Pd_i$ be the predicted values and $Cd_i$ the confidence values at depth d. The final prediction at depth d is $$Pavg_d = \Sigma_{i=1,N}[Pd_i * Cd_i]/\Sigma_{i=1,N}[Cd_i]$$

Associated with each $Pavg_d$ are the values, $Pd_i$, that went into the average. These are used to measure the confidence in the final prediction by casting them into the form of a density function.

$$Cfinal_d = K\Sigma_{i=1,N} \exp\{[(Pd_i - Pavg_d)/\sigma]^2\} \qquad 5$$

where K is an arbitrary scaling factor, and $\sigma$ is the standard deviation of $Pd_i$.

Figure 9:
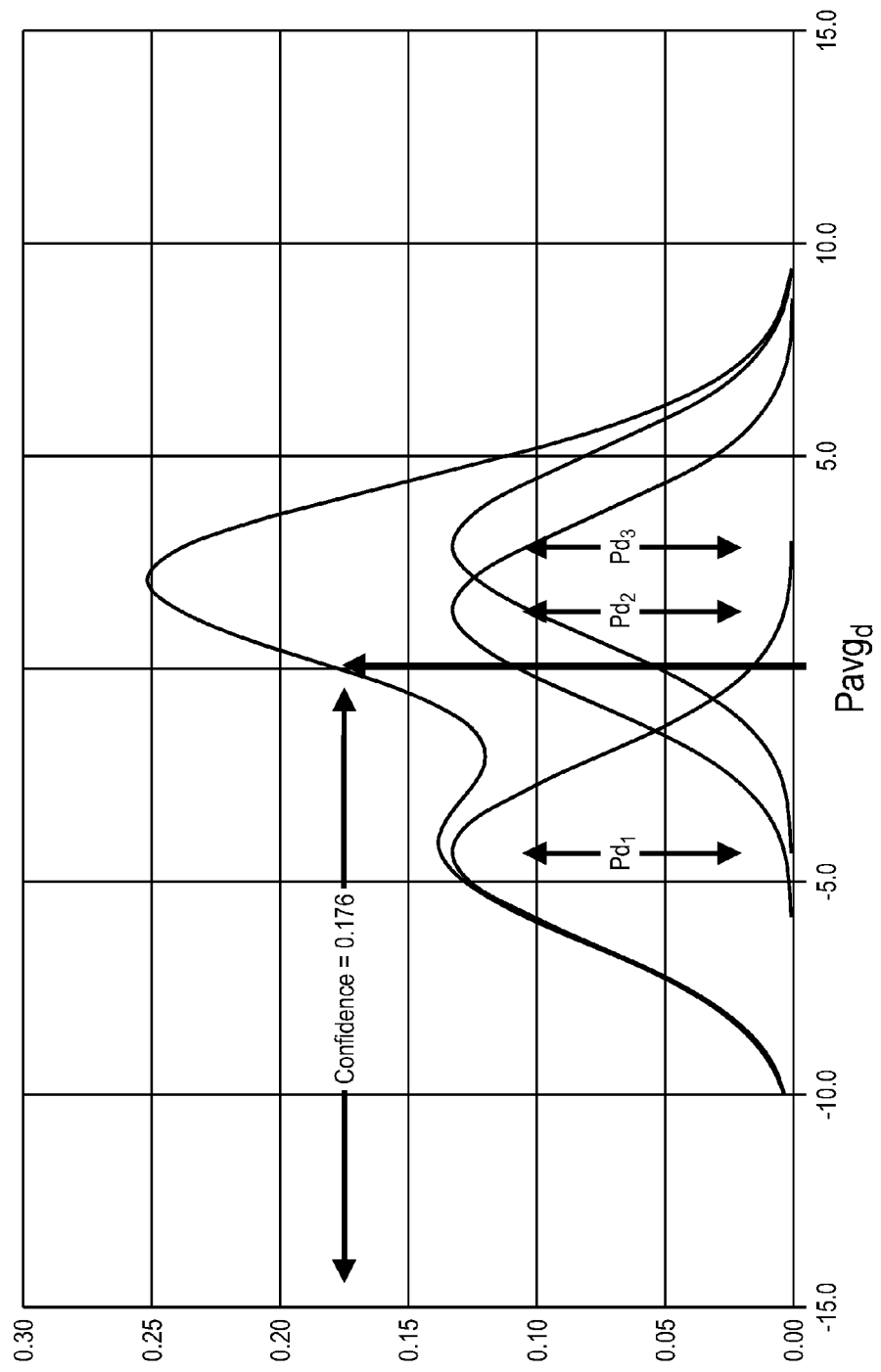
FIG. 9 illustrates how density functions are combined to measure confidence.

This is perhaps best understood if the individual curves represented by $\exp\{[(Pd_i - Pavg_d)/\sigma]^2\}$ are plotted, as shown in FIG. 9. Each of the smaller curves represents the function $\exp\{[(x - Pd_i)/\sigma]^2\}$ or its equivalent $\exp\{[(Pd_i - x)/\sigma]^2\}$.

FIG. 9 shows curves resulting from three values of $Pd_i$: $Pd_1$, $Pd_2$, and $Pd_3$. The sum of these curves is the confidence value, and the value of the sum at $Pavg_d$ is the confidence of this estimate.

We now have the final inter-well prediction for all values in the gap z, together with a confidence curve for the predictions.

What is claimed is:

1. A method for selecting samples of geological data for estimating missing data in well logging comprising:
   a. acquiring a data set comprising multiple data values indicative of at least one geological characteristic at locations in a subsurface interval of rock;
   b. identifying locations i in a subsurface rock where values $v_i$ are to be predicted;
   c. identifying data values associated with each location i such that each data value associated with a location i is an element $p_i$ and all elements $p_i$ form set P;
   d. identifying locations j in a subsurface interval of rock where data values $v_j$ from the data set, are known;
   e. defining elements $q_j$, to be samples $v_j$ and data at the same location as samples $v_j$ at a multiplicity of locations j to form set Q;
   f. for an element $p_i$ in set P, identifying one or more elements $q_j$ in set Q with data values indicative of the same geological characteristic as the $p_i$ sample is indicative of, such that the identified elements $q_j$ constitutes data elements $r_i$; and
   g. defining a data set R, comprising data elements $r_i$.

2. The method of claim 1, where locations i and j are depth locations in a well.

3. The method of claim 2, wherein i comprises locations in a first well log curve from a first well which is missing sample values.

4. The method of claim 3, wherein $p_i$ comprises sample values from a second well log curve in the first well and at the same depths i.

5. The method of claim 2, wherein j are locations in a first well log curve from a first well which is missing sample values comprising data in wells other than the first well at depths where value $v_j$ is known.

6. The method of claim 1, wherein values $v_j$ are known well log values.

7. The method of claim 6, wherein the data at the same location as samples $v_j$ at a multiplicity of locations j are log values at the same depth as $v_j$.

8. The method of claim 1, further comprising associating an element $q_j$ with an element $p_i$ by the Euclidean n-dimensional distance of $q_j$ from $p_i$ using only elements $q_j$ in set Q identified in step f of claim 1.

9. A method for selecting samples of geological data for estimating missing data in well logging comprising:
   a. acquiring a data set comprising multiple data values indicative of at least one geological characteristic at locations in a subsurface interval of rock;
   b. identifying well depth locations i in a subsurface interval of rock where values $v_i$ are to be predicted;
   c. identifying data values associated with each location i such that each data value associated with a location i is an element $p_i$ and all elements $p_i$ form set P;
   d. identifying well depth locations j in a subsurface interval of rock where data values $v_j$ from the data set, are known;
   e. defining elements $q_j$, to be samples $v_j$ and data at the same location as samples $v_j$ at a multiplicity of locations j to form set Q;
   f. for an element $p_i$ in set P, identifying one or more elements $q_j$ in set Q with data values indicative of the same geological characteristic as the $p_i$ sample is indicative of, such that the identified elements $q_j$ constitutes data elements $r_i$; and
   g. defining a data set R, comprising data elements $r_i$.

10. The method of claim 9, wherein i comprises locations in a first well log curve from a first well which is missing sample values.

11. The method of claim 10, wherein $p_i$ comprises sample values from a second well log curve in the first well and at the same depths i.

12. The method of claim 9, wherein values $v_j$ are known well log values.

13. The method of claim 9, further comprising associating an element $q_j$ with an element $p_i$ by the Euclidean n-dimensional distance of $q_j$ from $p_i$ using only elements $q_j$ in set Q identified in step f of claim 9.

14. A method for selecting samples of geological data for estimating missing data in well logging comprising:
   a. acquiring a data set comprising multiple well log data values indicative of at least one geological characteristic at locations in a subsurface interval of rock;
   b. identifying locations i in a subsurface interval of rock where well log values $v_i$ are to be predicted;
   c. identifying well log data values associated with each location i such that each data value associated with a location i is an element $p_i$ and all elements $p_i$ form set P;
   d. identifying locations j in a subsurface interval of rock where data values $v_j$ from the data set, are known;
   e. defining elements $q_j$, to be samples $v_j$ and data at the same location as samples $v_j$ at a multiplicity of locations j to form set Q;
   f. for an element $p_i$ in set P, identifying one or more elements $q_j$ in set Q with data values indicative of the same geological characteristic as the $p_i$ sample is indicative of, such that the identified elements $q_j$ constitutes data elements $r_i$; and
   g. defining a data set R, comprising data elements $r_i$.

15. The method of claim 14, where locations i and j are depth locations in a well.

16. The method of claim 15, wherein i comprises locations in a first well log curve from a first well which is missing sample values.

17. The method of claim 16, wherein $p_i$ comprises sample values from a second well log curve in the first well and at the same depths i.

18. The method of claim 15, wherein j are locations in a first well log curve from a first well which is missing sample values comprising data in wells other than the first well at depths where value $v_j$ is known.

19. The method of claim 14, wherein the data at the same location as samples $v_j$ at a multiplicity of locations j are log values at the same depth as $v_j$.

\* \* \* \* \*